(12) United States Patent
Guillen et al.

(10) Patent No.: US 8,200,593 B2
(45) Date of Patent: Jun. 12, 2012

(54) METHOD FOR EFFICIENTLY SIMULATING THE INFORMATION PROCESSING IN CELLS AND TISSUES OF THE NERVOUS SYSTEM WITH A TEMPORAL SERIES COMPRESSED ENCODING NEURAL NETWORK

(75) Inventors: Marcos E. Guillen, Washington esq con Juan de Salazar (PY); Fernando M. Maroto, El Cerrito, CA (US)

(73) Assignee: Corticaldb Inc, San Francisco, CA (US)

( * ) Notice: Subject to any disclaimer, the term of this patent is extended or adjusted under 35 U.S.C. 154(b) by 589 days.

(21) Appl. No.: 12/460,542

(22) Filed: Jul. 20, 2009

(65) Prior Publication Data
US 2011/0016071 A1 Jan. 20, 2011

(51) Int. Cl.
*G06E 1/00* (2006.01)
*G06E 3/00* (2006.01)
*G06F 15/18* (2006.01)
*G06G 7/00* (2006.01)
*G06N 3/04* (2006.01)

(52) U.S. Cl. ........................................... 706/27
(58) Field of Classification Search .................. None
See application file for complete search history.

(56) References Cited

U.S. PATENT DOCUMENTS

| | | |
|---|---|---|
| 5,640,494 A | 6/1997 | Jabri |
| 616,998 A | 1/2001 | Werbos |
| 636,336 A1 | 3/2002 | Liaw et al. |
| 664,362 A1 | 11/2003 | Jackson et al. |
| 717,432 A1 | 2/2007 | Ascoli |
| 2002/0143505 A1* | 10/2002 | Drusinsky ............... 703/2 |
| 2003/0090397 A1 | 5/2003 | Rasmissen |
| 2006/0184465 A1 | 8/2006 | Tsujino et al. |
| 2007/0094166 A1 | 4/2007 | Addison |
| 2008/0319934 A1 | 12/2008 | Oetringer |

FOREIGN PATENT DOCUMENTS
WO WO 2004-048513 A2 6/2004

OTHER PUBLICATIONS

Tan et al. "Bit-Split String-Matching Engines for Intrusion Detection and Prevention", ACM TACO, vol. 3, No. 1, 2006, pp. 3-34.*
Selvaraj et al. "Implementation of Large Neural Networks using Decomposition", Mathematics and Engineering Techniques in Medicine and Biological Sciences, 2002, pp. 7.*
Becchi et al. "A Hybrid Finite Automaton for Practical Deep Packet Inspection", CoNEXT 2007, pp. 12.*

* cited by examiner

*Primary Examiner* — Alan Chen
*Assistant Examiner* — Li-Wu Chang
(74) *Attorney, Agent, or Firm* — Lumen Patent Firm

(57) ABSTRACT

A neural network simulation represents components of neurons by finite state machines, called sectors, implemented using look-up tables. Each sector has an internal state represented by a compressed history of data input to the sector and is factorized into distinct historical time intervals of the data input. The compressed history of data input to the sector may be computed by compressing the data input to the sector during a time interval, storing the compressed history of data input to the sector in memory, and computing from the stored compressed history of data input to the sector the data output from the sector.

18 Claims, 5 Drawing Sheets

METHOD FOR EFFICIENTLY SIMULATING THE INFORMATION PROCESSING IN CELLS AND TISSUES OF THE NERVOUS SYSTEM WITH A TEMPORAL SERIES COMPRESSED ENCODING NEURAL NETWORK

FIELD OF THE INVENTION

The present invention relates generally to neural networks. More specifically, it relates to methods and devices for efficient computational simulation of biological neural networks.

BACKGROUND OF THE INVENTION

The study of the nervous tissue has proven very fecund in providing ideas to solve information processing problems. These solutions have been applied to practical problems such as data clustering, self organization or adaptive learning.

Artificial neural networks are computational simulations of biological neural networks such as found in the human brain. A typical artificial neural network includes set of nodes (i.e., models of neurons) whose inputs and outputs are connected to each other by links (i.e., models of synapses) to form a network. Each node processes its input signals to generate its output signals. Adaptive neural networks permit adaptation of the processing, allowing the neural network to learn.

The most common neural networks are idealized models that represent only the simplest features of a biological neural network. These models allow computationally efficient simulation of networks containing a large number of neurons, but they fail to represent subtler features of a biological neural network and have limited processing abilities. For example, in the McCulloch-Pitts neuron model the connection between two neurons is represented by a single scalar known as synaptic weight and the neuron is a linear operator composed of a non-linear threshold filter. Although this simplified neuron model works well when applied to problems like pattern recognition, because it does not represent the integration in time of incoming information it does not perform well in applications such as the identification of images in motion or the recognition of speech.

At the opposite end of the spectrum are artificial neural networks that use biophysically realistic models that closely resemble the biological structures and mechanisms, including accurate models of the detailed biophysics of neurons and synapses. Although these simulations based on such biophysical models provide more sophisticated processing capabilities, they have a much higher computational cost. Consequently, biophysically realistic cortical simulations are currently limited in practice to networks having a relatively small number of nodes. In particular, this approach is far from being able to efficiently simulate a neural network with a size comparable with that of a human brain, which is estimated to have in excess of $10^{14}$ neurons. Moreover, because some computational properties of a neural network emerge only when the network is sufficiently large, the limited size of these networks also limits their capabilities.

In short, existing neural network techniques are either limited in their processing ability due to their use of simplistic models or unable to implement very large networks due to their use of complex biophysically realistic models.

SUMMARY OF THE INVENTION

The present invention provides techniques for neural network processing that can efficiently simulate very large neural networks with a realistic model of neuron and synapse information processing. Accurate reproduction of neural computation is achieved without the computational complexity of exact biophysical modeling. Components of neurons, herein termed sectors, are represented by finite state machines. A single neuron is represented by a local network of sectors, and the entire neural network is represented by a network of these local networks. Different types of sectors accurately represent different sub-neural structure and processing without the complexity of biophysically realistic models. The finite state machines can be implemented using look-up tables, allowing the simulation to be efficiently computed for a very large number of neurons. These techniques for cortical processing have applications to large-scale simulations of the cortex for a diverse array of processing problems.

In one aspect, the invention provides a computer-implemented method for real-time simulation of a neural network. Definitions for a multiplicity of N distinct types of finite state machines (sector types) are stored in memory, where N is equal to the product of the number of neuron types to be emulated and the minimum number of different sub-neural processing unit types. There may be, for example, eleven different sub-neural processing unit types per neuron type to be simulated. Each sector type has a number of data inputs, a number of data outputs, types of data inputs, and a data compressor. A multiplicity of sectors, each being an instantiation of one of the sector types, is stored in memory. Assuming an average of 7500 active synapses per neuron in the human cortex, and a minimum of three sectors per synapse (e.g., a presynaptic response-type, a postsynaptic response-type, and a synaptic plasticity-type), the number of such instantiated sectors may be more than 22,500 per neuron, or more than $10^{15}$ for a complete human brain simulation. Each such instantiated sector has an internal state represented by a compressed history of data input to the sector. Preferably, the internal state of the three main synapse sectors uses no more than a combined 48 bits of memory per synapse, while the rest of the three main synapse sectors states, mainly the compressed history of the presynaptic and postsynaptic neurons, are stored only once, as part of the state of a hillock response-type sector, and shared by all sectors, minimizing memory requirements. The compressed history is factorized into distinct historical time intervals of the data input. The factoring of the internal state may be a Cartesian product of factors, where each factor is potentially shared by a collection of sectors (of the same or different types), and where each shared factor is stored in memory only once, therefore reducing the amount of memory necessary to describe the states of the sectors in the collective In some embodiments, the internal states may be constructed to emulate phenomena like the depletion of neurotransmitters and neuroreceptors, the secretion of synaptic vesicles or the formation and thickening of a synapse. For example, the internal states may be constructed using one or many scalars having correlates in quantities, concentrations, or sizes of biological entities. These entities and their corresponding scalars may change at different time scales, so that an incoming signal results in the modification of scalars in a cascade process, first altering scalars of shortest time scale by an amount depending on the incoming signal. These scalars may trigger the modification of other scalars that represent entities varying in larger time scales, and these affecting others of even larger time scale variation.

Interconnections are defined among data inputs and data outputs of the multiplicity of sectors, forming a network of sectors. The network of interconnected sectors are emulated in parallel using one or more processing nodes of a multiprocessor supercomputer. The emulating of each sector includes processing data input to the sector to produce data output from the sector and communicating the data output to other sectors in accordance with the defined interconnections among the sectors. The emulating may also include initializing each sector such that every sector of a given type is initialized in the same state. In other words, every sector of the same type starts in the same internal state, has the same number of input channels, and its internal state is at any time fully determined by its history of data inputs. Sectors of the same type differ in that they start at different times and have different input histories. In some embodiments the sectors may be stochastic. A stochastic sector has its internal state determined by the combined complete history of inputs and outputs of the sector. Hence, the output of a sector may be considered part of its input.

The processing of the data input to the sector includes computing the compressed history of data input to the sector, e.g., by compressing the data input to the sector during a time interval, and storing the compressed history of data input to the sector in memory. The processing may also include computing from the stored compressed history of data input to the sector the data output from the sector. In some embodiments, a sector with output function F unknown or with output function F too large to allow for RAM memory storage, may be replaced by another sector that maps the same input to the same output spaces and computes an arbitrary and easily computable output function Q, where Q is subjected to constrains imposed by the replication of some statistical property of F. In some embodiments, a sector's output X, perhaps a sequence of multiple outputs, the outputs having biological correlates (like axon potentials or released ions), may be substituted by a different single output defined as the memory address of a table. This table may directly link the initial (sub)states of receptor sectors with the final (sub)states of these sectors, where the initial and final (sub)state refer to some factor of the state of a receptor sector before and after receiving the output X.

In some embodiments, attenuation or evolution formulas are applied to signals traveling through axons or dendrites, where the signals represent electric potentials, action potentials, current intensities, pressure potentials or chemical concentrations. Preferably, the formulas are applied to a discrete and finite subset of the set of possible traveling signals by replacing a signal by a similar signal in the discrete and finite subset of possible signals, and then calculating or retrieving from memory the result of the evolution equation applied to the one signal in the discrete and finite subset.

In some embodiments, multiple signals that travel simultaneously through a dendrite are combined by adding the signals arithmetically, applying an evolution operator to the result, and then replacing the resulting signal by one signal in a discrete and finite subset of a set of possible signals.

To provide access to the multiplicity of sectors stored in memory, the method may also include generating search-engine style dictionaries and inverted indices. Sector state values and sector connectivity maps can be shortened and stored on in-memory ordered lists or linked lists, where each data item in these lists is accessed either by pointers or read sequentially, sequentially only if all the entries in the list require similar processing and are processed during the sequential traversal of the list. No row numbers or primary key numbers are stored, using the list offset as primary key instead. No binary or serial searches are performed, only direct memory address lookups through the use of stored pointer values or as the result of simple arithmetic operation involving the values of pointer, offset and/or counters.

The data compressor of a sector type T, denoted $\Sigma = \sigma_T(x)$, where $x = \{x_0, x_1, \ldots x_w\}$ is the time-sorted sequence of data inputs to the sector such that $x_p$ is the complete data input to the sector at p discrete time steps before $x_0$. The data compressor $\Sigma = \sigma_T(x)$ is defined to compress with constraint $y(0) = T(\Sigma(0))$, where $y(0)$ represents data output from the sector at a time $t=0$. The data compressor is preferably factorable into data compressors, each of which is defined on a non-empty subset of data inputs to the sector, e.g., $\Sigma = \Sigma_{\{1\}} \times \Sigma_{\{2\}} \times \Sigma_{\{1,2\}}$. The data compressor of each sector type preferably includes a lookup table stored in memory, and computing the compressed history of data input to the sector may include accessing a lookup table for a sector type for the sector.

These and other aspects of the invention will become apparent from the following description and associated figures.

DETAILED DESCRIPTION

Embodiments of the present invention represent neuron components using finite state machines, which are also called sectors. This representation, as well as various techniques used in embodiments of the invention, may be understood by first considering the following computational black box model.

Figure 1:
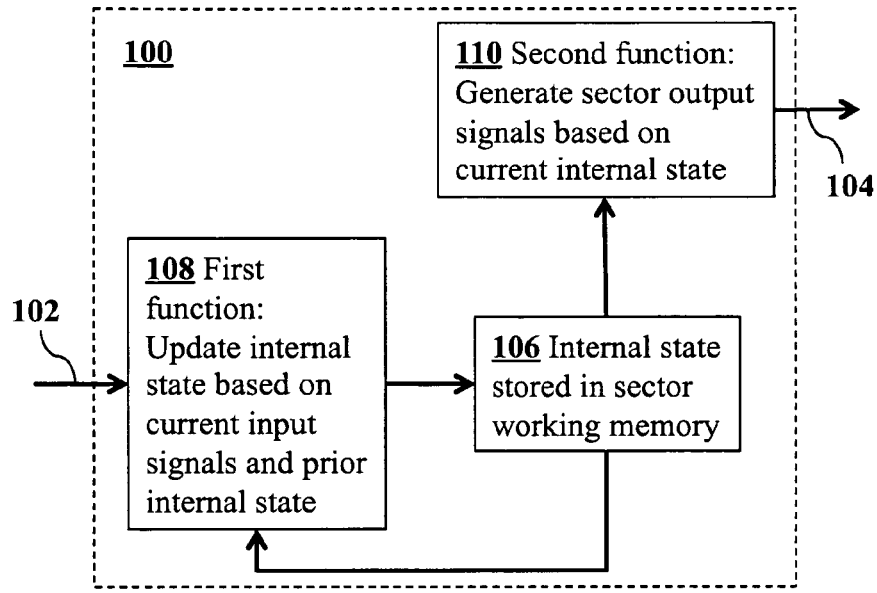
FIG. 1 is a schematic diagram of a black box model of a finite state machine model of a sub-neural sector according to an embodiment of the invention.

As illustrated in FIG. 1, suppose a computational black box 100 has a discrete time input 102, a discrete time output 104, an internal state 106 stored in a working memory, and an unknown algorithm. We assume without loss of generality that the working memory is empty at an initial time. The output signal 104 at a given point in time is thus a function of the entire sequence of input signals received by the box. This function can be decomposed into a first function 108 that maps an input signal 102 and internal state 106 of the box to a new internal state and a second function 110 that maps the internal state 106 to the output signal 104. It is clear, then, that the information of the internal state is bound by the information contained in the entire input history. Thus, the working memory can always be compressed so that it is no larger than the memory that would be required to store the entire input history.

From considerations of the information processing of biological neurons, the black box model can be further refined to provide an accurate model for sub-neuronal information processing. In other words, rather than attempting to construct an exact biophysical model of the processes that support neuronal data processing or figuring out the processing itself, the present approach is to construct a model of sub-neuronal components, called sectors, from biophysical knowledge of constraints on the amount of information, the structure of the information, and the dynamics of their information content. These sub-neuronal components may then be assembled to form neurons and then a network of neurons.

Neuronal sub-processes and corresponding components can be identified by determining the media used to store information and reliable signaling channels used to interchange information. Once input and output lines are identified, the neuron's data processing is divided into a network of separated processes.

Nerve cells have three primary types of signaling: the release of neurotransmitters at the synaptic cleft, the generation and propagation of postsynaptic potentials inside the neuron, and the emission of axonal spike-like messages or action potentials. These three types of signaling are biologically localized at different parts of the neuron and are largely decoupled from each other, at least on the time scale of the signaling. Thus, each of these data translation mechanisms is suitable for modeling as a distinct type of sector (also known as finite state machine) endowed with its own working memory (whose contents are the internal state). We then have identified eleven distinct types of sectors that model components of a spiking neuron: 1) a presynaptic response type, 2) a axoaxonic presynaptic response-type, 3) a postsynaptic response type to model basic synaptic signaling, 4) a synaptic plasticity type, 5) a synaptic metaplasticity type to model further signal modulation, 6) plasticity states, 7) metaplasticity states, 8) synapse maintenance-type, both responsible of synapse formation, maturation, and elimination of new, mature and silent synapses, 9) a hillock response type, 10) a neural adaptation-type to model spike firing threshold and cell-wide signal modulation, and 11) a nucleus-type sector that models the hub of the neuron which receives chemical signals from other components of the neuron such as synapse-to-nucleus calcium signaling. Additionally, an axon-type sector and a dendrite-type sector can be defined as finite state machines endowed with some working memory of transient content that fades away every few milliseconds, modeling the transport of presynaptic and postsynaptic potentials to and from the axon-hillock with possible alteration and delay according to predefined morphology features. Because the axon hillock and the synapses are unable to distinguish the origin of arriving presynaptic or postsynaptic potentials, their corresponding sectors have working memories that do not contain information regarding signal source. The complete dendrite tree of a neuron can be modeled by a network of multiple synapses and dendrite sectors whose net output is a single data channel to the neuron's soma, which is another sector type.

Figure 2:
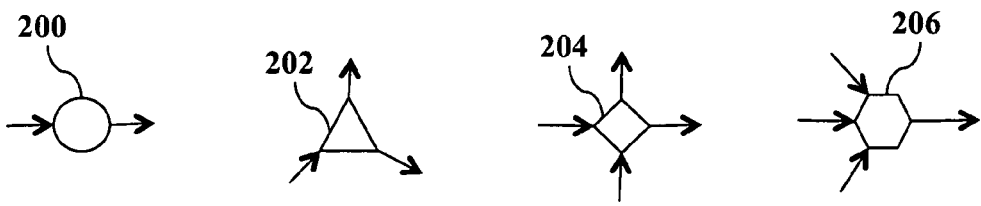
FIG. 2 is a schematic diagram illustrating distinct types of finite state machines, or sector types, according to an embodiment of the invention.

These distinct sector types serve as templates for actual sector instances. Each sector type is characterized by a number of inputs, number of outputs, type of inputs and type of outputs, as well as by internal structure and processing, as will be detailed further below. FIG. 2 schematically illustrates four different sector types 200, 202, 204, 206. Sector type 200 has one input and one output, sector type 202 has one input and two outputs, sector type 204 has two inputs and two outputs, and sector type 206 has three inputs and one output. The distinct shapes of the sector types schematically represent the distinct manner in which each sector type may process the input signals to produce output signals. More generally, a multiplicity of N distinct types of finite state machines (sector types) are defined and stored in memory. N is preferably no more than 11 per neuron-types to be simulated. Each sector type has a number of data inputs, a number of data outputs, types of data inputs, and a data compressor that is used for processing data within the sector.

Further consideration of sub-neuronal information processing can guide the design of the working memories of the sector types. For example, the synapse response and hillock's response to an arriving signal is an immediate cause-effect reaction. Consequently, the output signals for these sector types are functions of only the recent input history, i.e., it is sufficient that the internal state retain information for the input history from 100 ms into the past. The working memory can also store various other types of information about the neural component: the number of synaptic vesicles in the presynaptic density, the concentrations of different ions involved in the data processing, number of protein modifications.

Figure 3:
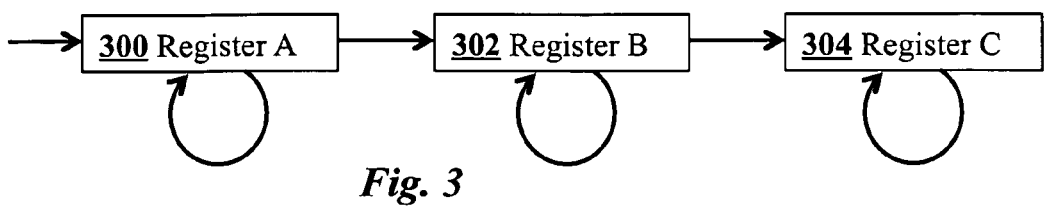
FIG. 3 is a schematic diagram illustrating a sequence of memory registers in a sector for storing signal information corresponding to different time scales, according to an embodiment of the invention.

Sectors may be connected together to reflect the known biological relationships between their corresponding sub-neuronal components. For example, a postsynaptic-type sector has two input channels: synaptic cleft composition (channel 1) and postsynaptic cell activation (channel 2), which are connected to the outputs of presynaptic-type and hillock-type sectors, respectively. Based on empirical studies of the so-called Spike Timing Dependant Plasticity, STDP, a model of the postsynaptic-type sub-neuronal component, the input processing function for this sector type processes the data from both input channels as shown in FIG. 3. The data is stored immediately after arrival in a register A 300 for a round 5 ms; then this data is transferred to another register B 302 where it remains for a period of time from 40 to 100 ms; finally, the data is stored in a register C 304 for at least 30 minutes. The duration of an action potential (no less than 1 ms) sets the data sampling frequency to 1 KHz for the postsynaptic cell activation input line (channel 1). Sampling rates for the output line, the postsynaptic potential, may be set in the range from 1 to 50 KHz, preferably 10 KHz. The sampling rate for channel 1, the synaptic cleft composition, can be made equal to the sampling frequency for the axon, i.e., 1 KHz. Thus, the clock rate for the postsynaptic-type sector is on the order of 10 KHz, the largest of the three sampling rates involved.

Figure 4:
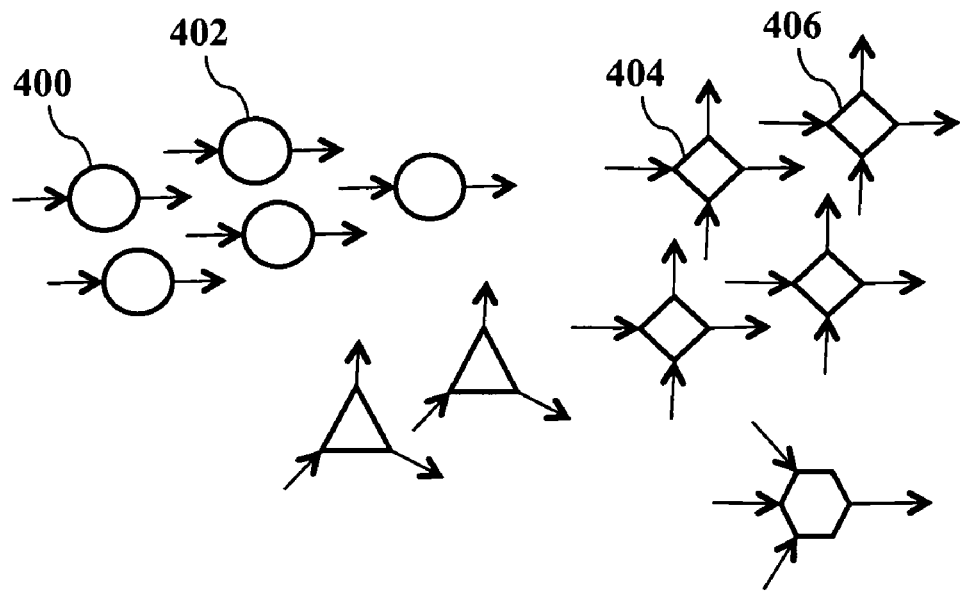
FIG. 4 is a schematic diagram showing multiple instantiations of various different sector types, according to an embodiment of the invention.

Empirical studies may also be used to determine the data sampling resolution, i.e., dynamic range, of the signals. For example, a discrete set of around 3000 states adequately describes the possible values of the postsynaptic current (EPSC). This number can be derived from the upper and lower bounds of the postsynaptic current (that ranges in an interval between 10 pA to 1 nA) and the measured changes of EPSC induced by correlated spiking which were found to be consistent with the application of a multiplicative factor to the intensity of current. If the decay of the postsynaptic potential is constant or is not regulated by the synapse, then the amplitude at the onset fully characterizes the entire signal. Therefore, 11 to 13 bits of information would be output by the synapse as a response to an action potential. More generally, the amount of information output per spike can be calculated from the sampling frequency and the maximum decay rate for the current. Estimating that the postsynaptic current vanishes 10 ms after the onset, no more than 130 bits would be output per spike. This output bandwidth can then help estimate the size of the working memory. Assuming that, after some period of inactivity, a synapse's response to an isolated spike is fully determined by the synaptic strength, then 11 to 13 bits should be sufficient for the long term working memory of the synapse. The amount of short term memory may be estimated from the maximal frequency at which hippocampal neurons can activate, around 200 Hz. As described above, input information stays in register B 302 no more than 40 to 100 ms before being transferred to register C 304 (i.e., the "long term memory"). A 200 Hz input rate during 100 ms leads to 20 inputs, each one for a single action potential that may or may not be present. Assuming all the action potentials essentially equivalent, 1 bit of information is transferred per spike. This leads to 20 bits associated to the presynaptic action potentials plus another 20 bits for the postsynaptic action potentials. Thus, 40 bits are estimated to be sufficient to account for the total Spike-Timing-Dependant short term memory of a synapse, and are stored distributed among the two hillock-type response sectors corresponding to the pre and post synaptic neurons. We estimate that the memory necessary to store the states of all synapse-specific sector instantiations (a presynaptic response-type, or a axoaxonic presynaptic response-type, a postsynaptic response type, a synaptic plasticity type, and a synaptic metaplasticity type) totals six bytes per synapse (7500 synapses×6=45 kB per neuron), plus the neuron history information, shared by all synapses with the pre and postsynaptic axon hillock sector, thus adding less than 1 kB per neuron when combined with the states all other cell-wide sectors. We estimate this to be the minimum necessary number of states to simulate the hillock response, neural adaptation, synaptic responses and the three phases of synaptic plasticity, including short term plasticity, LTP and LTD, plus the five metaplasticity synaptic states (as defined by 'Discrete synaptic states define a major mechanism of synapse plasticity', Johanna M. Montgomery and Daniel V. Madison). Extra ancillary information, such as dendrite and axon morphology and topology profiles, is stored separately in implicit or explicit form, requiring some extra system memory, independent of the number of neurons or synapses. Once the sector types are defined and stored in memory, a collection of sectors, each being an instantiation of one of the sector types, is stored in memory. The number of such instantiated sectors may be more than $10^{14}$. FIG. 4 illustrates a small collection of twelve sectors which are instances of the four sector types shown in FIG. 2. Sectors 400 and 402, for example, are instances of sector type 200 (FIG. 2). Similarly, sectors 404 and 406 are instances of sector type 204 (FIG. 2).

Figure 5:
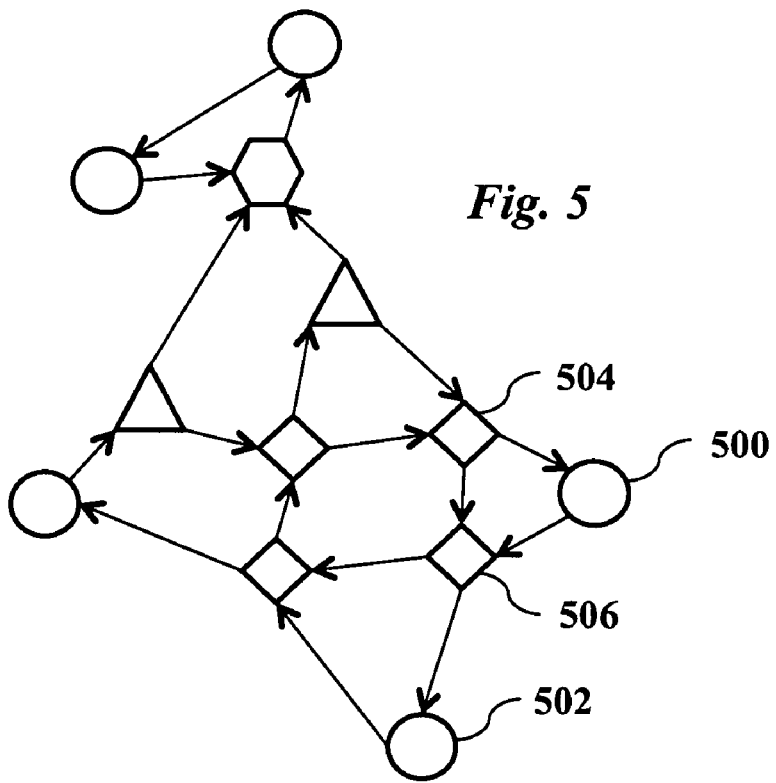
FIG. 5 is a schematic diagram illustrating a portion of a neural network composed of interconnected instantiations of various sector types, according to an embodiment of the invention.

As shown in FIG. 5, interconnections may be defined among data inputs and data outputs of the sector instances, forming a network of sectors. The example of FIG. 5 shows interconnected sectors 500, 502, 504, 506 corresponding to sector instances 400, 402, 404, 406 (FIG. 4), respectively. More generally, network interconnections may be designed appropriately to simulate various biologically accurate cortical circuits. For example, human scale cortical columns may be modeled as 60-80 cortical columns, with 80-100 neurons each, and 7500 active synapses per neuron on average. A probability of connection of about 0.09 yields 84.000 different axo-dendritic touch sites where synapses could appear and disappear depending on neuronal activity.

Figure 8:
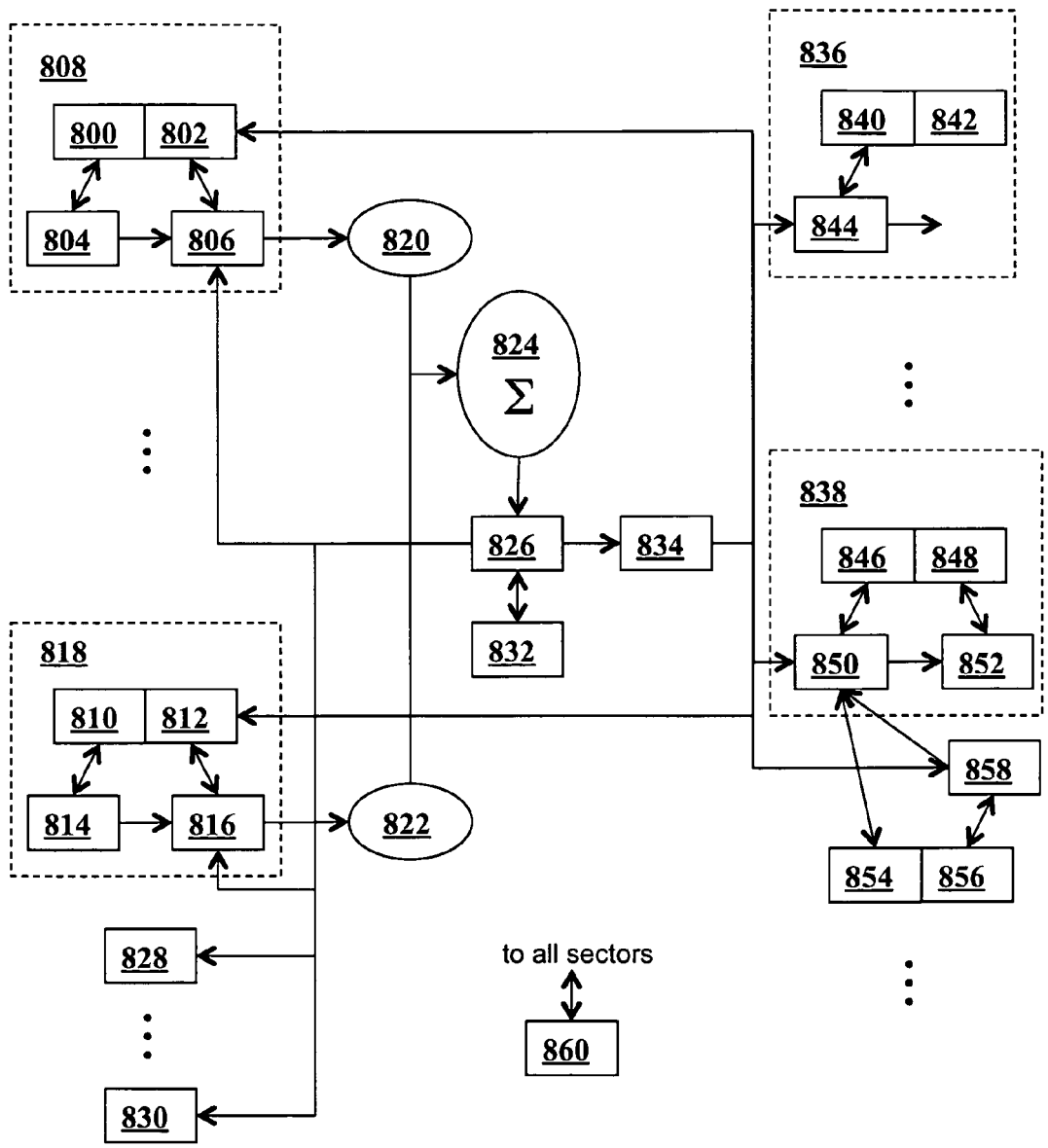
FIG. 8 is a block diagram of a portion of a neural network composed of interconnected instantiations of various sector types, according to an embodiment of the invention.

FIG. 8 is a block diagram of a portion of a neural network composed of interconnected instantiations of various sector types. Synaptic metaplasticity sector 800 and synaptic plasticity sector 802 have inputs to and outputs from presynaptic response sector 804 and postsynaptic response sector 806, respectively. In addition, output from sector 804 is input to sector 806. These four sectors 800, 802, 804, 806 form a subnetwork 808 which is first in a sequence of similar subnetworks ending in sub network 818, which includes sectors 810, 812, 814, 816. Synaptic metaplasticity sector 810 and synaptic plasticity sector 812 have inputs to and outputs from presynaptic response sector 814 and postsynaptic response sector 816, respectively. In addition, output from sector 814 is input to sector 816. Outputs from sectors 806 and 816 are input, respectively, to dendrite sectors 820 and 822. Outputs from dendrite sectors 820 and 822 are additively combined in a combining block 824. The combined signal from block 824 is input to hillock response sector 826. Output from hillock response sector 826 is fed back to postsynaptic response sectors 806 and 816, as well as to synapse maintenance sectors 828 through 830. Hillock response sector 826 also has inputs to and outputs from neural adaptation sector 832. Output from hillock response sector 826 is input to axon-type sector 834 whose output is input to a sequence of subnetworks 836 through 838. Subnetwork 836 contains sectors 840, 842, 844. Synaptic metaplasticity sector 840 is joined to synaptic plasticity sector 842 and has input to and output from presynaptic response sector 844. Other subnetworks in the sequence have similar structure except for the final subnetwork 838 which contains sectors 846, 848, 850, 852. Synaptic metaplasticity sector 846 and synaptic plasticity sector 848 have inputs to and outputs from presynaptic response sector 850 and postsynaptic response sector 852, respectively. In addition, output from presynaptic response sector 850 is input to synaptic metaplasticity sector 854 joined to synaptic plasticity sector 856. Synaptic plasticity sector 856 has input from and output to axo-axonic presynaptic response sector 858. Axo-axonic presynaptic response sector 858 also has output to presynaptic response sector 850. In addition, axo-axonic presynaptic response sector 858 receives input from axon-type sector 834. Finally, nucleus-type sector 860 has input from and output to all sectors.

The network of interconnected sectors representing a few million neurons can be emulated using one single high-memory capacity computer server. This task is a so-called embarrassingly parallel problem, and is easily scalable as a parallel task distributed through different threads, processors, processor cores, or computer cluster nodes. Large simulations such as whole human brain simulations are preferably emulated in parallel using a multiprocessor supercomputer, e.g., high-memory capacity servers clustered over cost effective solutions such as gigabit Ethernet. During emulation, signals passing between the sectors are representative of the information content of physical signals in a biological network, while signal passing between different computer nodes represent axonal signals from mostly long distance axon connections, 1 bit transferred per each axon crossing to a different node, allowing for $10^9$ such axons to be updated per node each second. In one embodiment, the simulation is coded in C and uses all-in-memory associative arrays to implement the evolution and response maps. Memoization optimization techniques may be thoroughly used to speed up most operations. Neurons and synapses are accessed with the help of search-engine style inverted indexes, and dictionary techniques similar to those used in the Lempel-Ziv-Welch compression algorithm are used to store synaptic values and connectivity maps. Generating the search-engine style dictionaries and inverted indices can be implemented by storing shortened sector state values and sector connectivity maps on in-memory lists. Data items in the in-memory lists may be accessed either by pointers or sequentially. Sequential access is used if all the entries in the list may be similarly processed during the sequential traversal of the list. No row numbers or primary key numbers are stored, using the list offset as primary key instead. No binary or serial searches are perform, only direct memory address lookups through the use of stored pointer values or as the result of simple arithmetic operation involving the values of pointer, offset and/or counters. Networks with up to a million cells may be simulated in a single server with a simulation speed of around 10 cycles per second. The model implemented 1,150,000 cells per server, each with 100,000 potential and 7500 active synapses. A total of 8,625,000,000 synapses may be emulated and stored in one single multiprocessor computer node.

Figure 6:
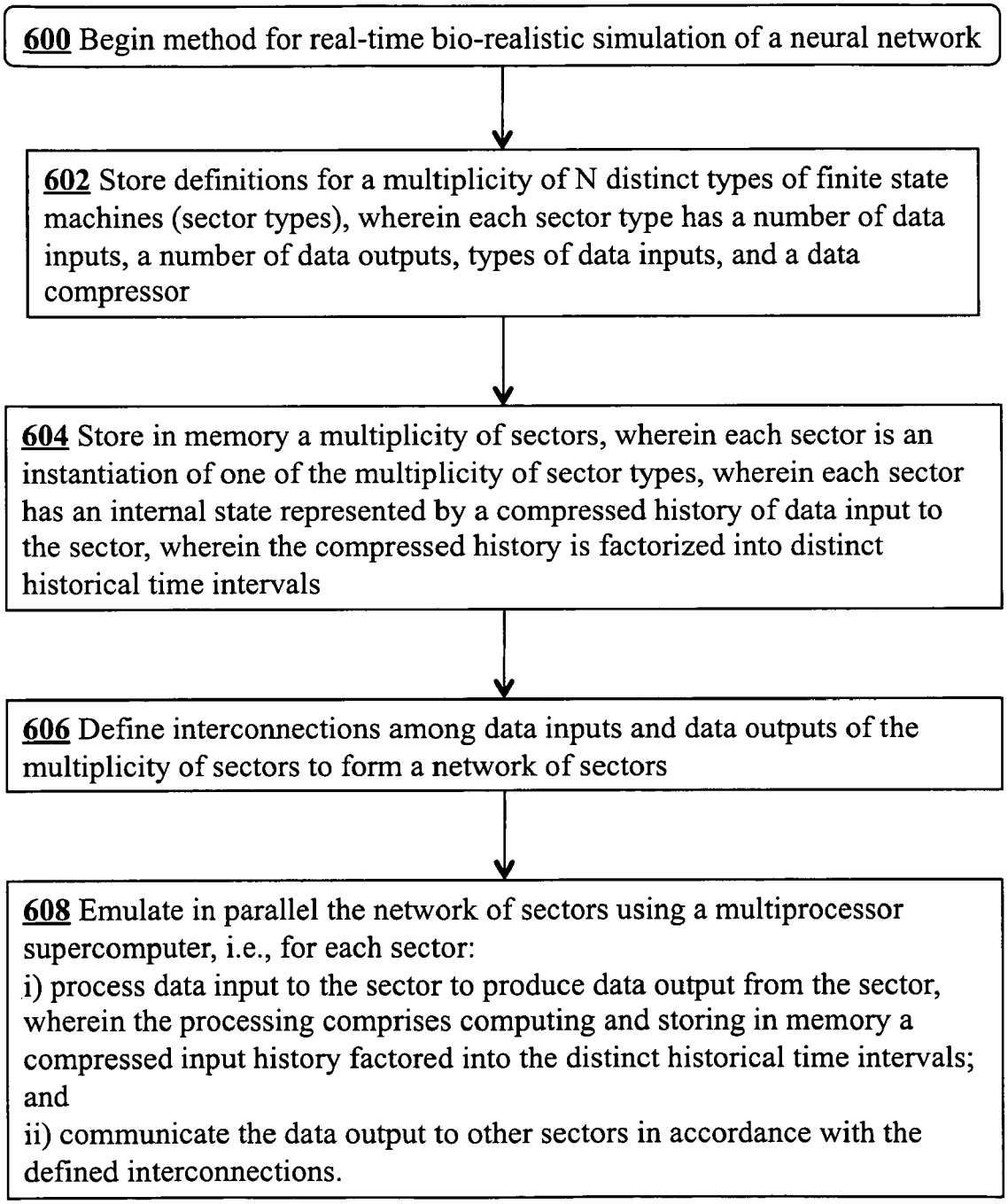
FIG. 6 is a flowchart illustrating the main steps of a technique for simulating a neural network according to one embodiment of the invention.

FIG. 6 is a flowchart illustrating the main steps of a technique for simulating a neural network according to one embodiment of the invention. The method begins at step 600. In step 602 definitions for the distinct sector types are stored in memory, as described above. In step 604 instances of the sector types are stored in memory and in step 606 interconnections between the sectors are defined and stored in memory. The network having thus been defined, the emulation is performed in step 608.

The emulating of each sector in step 608 preferably begins by initializing each sector such that every sector of a given type is initialized in the same state. During the emulation, data input to each sector is processed to produce data output from the sector, and the data output is communicated to the inputs of other sectors in accordance with the defined interconnections among the sectors. The processing of the data input to the sector includes computing the compressed history of data input to the sector, e.g., by compressing the data input to the sector during a time interval, and storing the compressed history of data input to the sector in memory. The processing may also include computing from the stored compressed history of data input to the sector the data output from the sector. To provide access to the multiplicity of sectors stored in memory, the method may also include generating search-engine style inverted indices.

Each such instantiated sector has an internal state represented by a compressed history of data input to the sector. Preferably, the internal state uses no more than 48 bits of memory per synapse. The compressed history is factorized into distinct historical time intervals of the data input.

Figure 7:
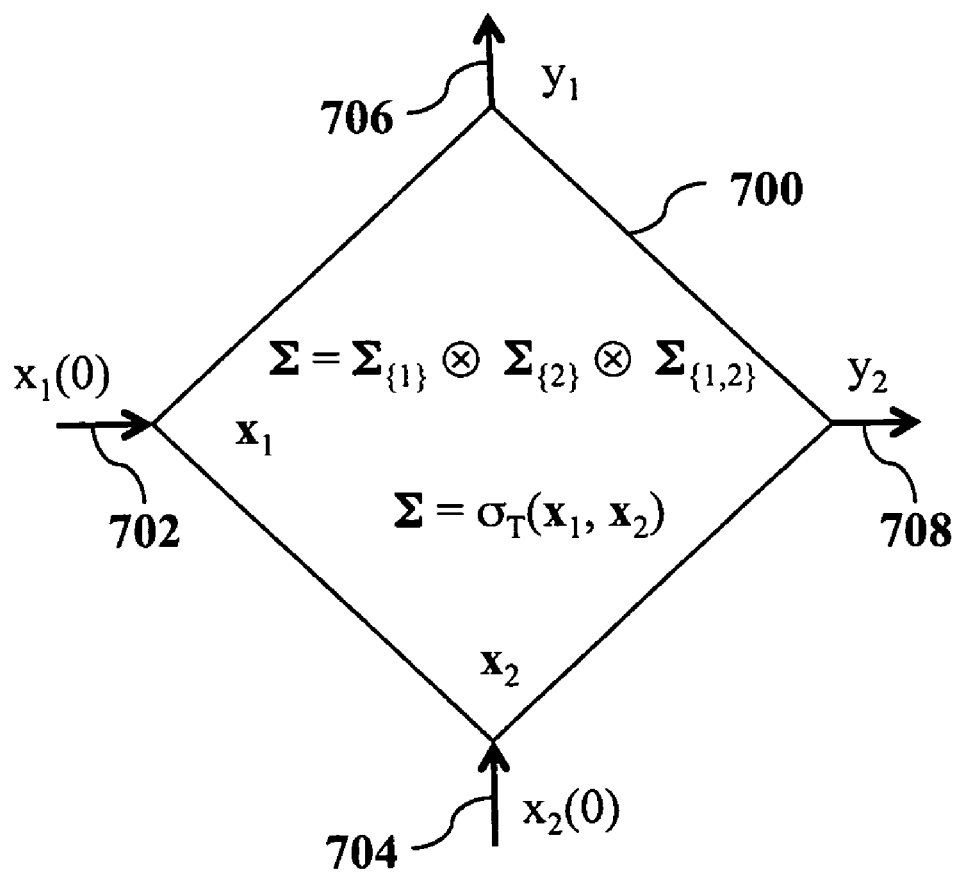
FIG. 7 is a schematic diagram illustrating details of a sector type including inputs to the sector, outputs from the sector, and factorized internal state of the sector.

The input history of a sector may be represented as a chain of data values indexed by a discrete time parameter m, a natural number, that increases backwards in time. At each time interval, the data inputs are "pushed" towards higher m values and the most recent data input is assigned index m=0. A data compressor that operates over a sector's input history is defined for every type of sector, so that the sector's response can still be reconstructed from the compressed data. For a given sector of type T having n input signals $x_1, x_2, \ldots, x_n$, the compressor is described as a function $\Sigma = \sigma_T(x_1, x_2, \ldots, x_n)$, where each input signal $x_k$ is a time-indexed sequence $x_k = \{x_k(0), x_k(1), \ldots, x_k(m), \ldots\}$. Thus, $\Sigma(0)$ is the sector's internal state at time t=0, i.e., at the present. The data compressor $\sigma_T$ is defined to compress with constraint $y(0) = T(\Sigma(0))$, where $y(0)$ represents data output from the sector at a time t=0. For example, FIG. 7 schematically illustrates a sector 700 having two input channels 702, 704 and two output channels 706, 708. Signal $x_1(0)$ is present on input channel 702 and signal $x_2(0)$ is present on input channel 704. These signals become part of the time-indexed sequences $x_1 = \{x_1(0), x_1(1), \ldots, x_1(m), \ldots\}$ and $x_2 = \{x_2(0), x_2(1), \ldots, x_2(m), \ldots\}$, respectively. Within the sector, the compressor $\Sigma = \sigma_T(x_1, x_2, \ldots, x_n)$ is preferably factorable into component data compressors, each of which is defined on a non-empty subset of data inputs to the sector. For example, a sector 700 with two input channels may be factored as $\Sigma = \Sigma_{\{1\}} \otimes \Sigma_{\{2\}} \otimes \Sigma_{\{1,2\}}$. More generally, for a sector with n input channels, $\Sigma = \Sigma_{[1]} \otimes \Sigma_{[2]} \otimes \ldots \otimes \Sigma_{[2^n-1]}$, where the subscripts range over the non-empty subsets of the n input channels. Thus, the sector's internal state is decomposed into multiple corresponding factors, each carrying information corresponding to a compressed sequence of a portion of the sector's input history. The compressor and state may also be factored in additional ways as well, as will be described in more detail below.

Each sector type T has an evolution function $\phi_T$ that defines how the internal state of the sector changes with each discrete time step. Since this function depends on the current input and prior state, it may be denoted as $\Sigma(0) = \phi_T(\Sigma(1), x_1(0), x_2(0), \ldots, x_n(0))$. This evolution function also may be factored, i.e., $\phi_T = \phi_{T[1]} \otimes \phi_{T[2]} \otimes \ldots \otimes \phi_{T[2^n-1]}$, so that the evolution function $\phi_{T[k]}$ defines the evolution of a particular subset [k] of inputs to the sector of type T. For example, for [k]={1,3}, $\Sigma_{\{1,3\}}(0) = \phi_{T\{1,3\}}(\Sigma_{\{1,3\}}(1), \Sigma_{\{1\}}(0), \Sigma_{\{3\}}(0))$ and for [k]={1}, $\Sigma_{\{1\}}(0) = \phi_{T\{1\}}(\Sigma_{\{1\}}(1), x_1(0))$. This factorization allows the functions and internal states of the sectors to be efficiently stored in memory by sharing common data. For example, the axon's action potential is an input channel shared by hundreds or thousands of synapses along the axon. Because all the synapses are the same sector type and share the same input from the same axon, the information need only be stored once for all the synapses in the neuron. Moreover, even if there are two distinct sector types P and Q, if those sectors share the same input channels then their evolution functions defined on those channels can be shared. In addition, their internal states defined on those channels can also be identified.

The factoring also serves to make computation more efficient because a state $\Sigma_{[k]}$ can be further factored into a triggering component $\Sigma_{[k]}^+$ and accumulative component $\Sigma_{[k]}^-$, i.e., $\Sigma_{[k]} = \Sigma_{[k]}^+ \otimes \Sigma_{[k]}^-$. Similarly, the evolution function is factored as $\phi_{T[k]} = \phi_{T[k]}^+ \otimes \phi_{T[k]}^-$. This allows the accumulative components of the evolution function to be computed only when some dependent triggering component changes, while the triggering components of the evolution function to be computed to refresh the triggering component of the state when its accumulative component changes.

The internal states and evolution functions can also be factored temporally into components corresponding to distinct time scales, i.e., distinct time intervals. This factoring represents the temporally distinct types of memory in synapses. For example, let g be a monotonically increasing function such that g(0)=1. Then discrete time scale intervals indexed by s are given by $\{m | g(s) \leq m < g(s+1)\}$, where m is the discrete time index. The state then decomposes into time scale factors $\Sigma = \otimes \Sigma_s$, where the product is over all $s \geq 0$. Each factor $\Sigma_{[k]}$ decomposes similarly, and the evolution function also decomposes into factors for each time scale, s. This provides data compressors for the input sequence arrived at a given time period, and this time scale factorization models various features of biological neurons. For example, the quantity or concentration of neurotransmitters and neuroreceptors is a scalar that varies in a time scale determined by the characteristic depletion and replenishment periods of the molecule. Furthermore, neurotransmitters and neuroreceptors are often depleted in fixed amounts. If a neurotransmitter (or neuroreceptor) is significant for the data processing taking place in some sector, a scalar associated to the neurotransmitter should be encoded in the sector's internal state component of time-scale matching the scale of variation of the biomolecule.

The channel and time scale factorization allow the simplification of the evolution functions by splitting them in a series of functions that operate only in some particular subspace of the sector's state. Since evolution functions are stored rather than computed, an eventual increase of complexity as a side effect of the state factoring is not inconvenient.

The data compressor of each sector type preferably includes a lookup table stored in memory, and computing the compressed history of data input to the sector may include accessing a lookup table for a sector type for the sector. The contents of the look-up tables for the various sector types may be pre-calculated using genetic or evolutive programming and/or determined through experimentation. For example, if the available data is insufficient to complete a table, it can be completed using a genetic algorithm with a performance test as fitness function. The fitness function can be specific for the sector type or, alternatively, a global performance test for the complete neuron or neural network can be used. A single precomputed lookup table for a given sector type can be stored in memory and accessed by every instantiation of that sector type. The lookup table thus requires very little memory per sector and provides high computational efficiency.

Once the evolution and output functions are in place, and the sector simulations reproduce their corresponding output signals up to a required level of accuracy, the efficiency may be improved through the elimination of contingent communication codes. This can be performed iteratively for each type of sector, as follows. Instead of using the constraint $y(0)=T(\Sigma(0))$, the internal state of a given sector type T is updated using the constraint $\Sigma_{\{xT\}}^+(0)=T(\Sigma(0))$, where $\Sigma_{\{xT\}}^+(0)$ is the triggering component corresponding to the internal state of the sectors receiving the output of T. If a size reduction of the internal state of T is achieved, the sector T is replaced by the new one. The process may be repeated many times for every type of sector. $\Sigma_{\{xT\}}^+(0)$ can be understood as an alternative communication code equivalent to $y(0)$. The smaller the dimension of the internal state of sectors, the higher become the entropy of the new communication codes, and the higher the efficiency of the simulation. The presented procedure compresses destructively the information needed to predict the sectors' outputs while compressing the internal state corresponding with the complete system without loss.

If, for a given sector type, the dimension of its internal state is very large, its output function lookup tables may consume an undesirable amount of memory. Under some circumstances, this issue may be addressed by replacing the output function for a given sector type with another function that maps the same input to the same output spaces and has similar statistical properties. The output function and the substitution function can be statistically similar in a variety of ways, for example, by sharing the same probability distribution for the size of the image set and/or inverse image set of an input or output state. The substitution function can then be chosen to have the required statistical properties and to be easily computable. Statistic similarity may be determined using genetic and evolution programming techniques. A sector with output function F unknown or with output function F too large to allow for RAM memory storage may be replaced by another sector that maps the same input to the same output spaces and computes an arbitrary and easily computable output function Q, where Q is subjected to constraints imposed by the replication of some statistical property of F.

In the use of compressed codes, it is possible to take advantage of the linear evolution and/or summation of quantities by selecting a prototype signal, or profile, for each possible value of the compressed code. Suppose that a sector type T outputs a signal $y(0)=T(\Sigma(0))$ that compresses to a signal $\Sigma_{\{xT\},0}^+(0)=T^*(\Sigma(0))$ after the procedure described above is applied. A profile $y|\Sigma_{\{xT\},0}^+|$ can be selected for each value of $\Sigma_{\{xT\},0}^+$, calculating it by exhaustive simulation or direct measurement of signals. Profiles may be preselected prior to simulation or dynamically selected during simulation. The profile can be chosen, for example, to be an average of all the signals compressing to $\Sigma_{\{xT\},0}^+$, to be an extreme value of these signals, or simply to be a value selected following some heuristic procedure. Once profiles are set, each word in the compressed code can be associated with a profile, the profile can be used to obtain signal y', and signal y' can then be transformed back into the corresponding compressed code using a maximal likelihood measure between y' and all the finite set of profiles. The resulting profiles correspond by construction with words used for the communication of meaningful changes in the component of shortest time-scale (component 0) of the sectors receiving the signals. Also, profiles can be obtained heuristically by identifying output signals that change the state of sectors, bounding the range and noise of the signals, and choosing one among the plurality of signals that produce the same change in the receptor sector.

The profiling results in a schematization of the input and output signals of sectors compatible with keeping intact the information processing functions of the complete nervous system. As an illustration, suppose that the profiling technique is applied to a sector representing the presynaptic part of a chemical synapse. The input and output profiles correspond respectively to typical presynaptic action potentials and typical patterns of secretion of neurotransmitters released to the intersynaptic space.

Profiling can be used to make possible the application of known attenuation equations for potentials propagating through dendrites or axons while using compressed communication codes. It allows the emulation of dendrite sections of variable length between two synapses by using, for example, the cable equation. The profiling is useful when the evolution of a signal is computable through any efficient mechanism including non-linear evolution operators. It is especially convenient in situations when linear superposition of action potentials in dendrites apply; if potentials or currents can be algebraically added, the corresponding profiles can be added as well.

The discrete time processing rate of sector is preferably no faster than the rate of the slowest of its input and output lines. For example, the presynaptic-type sector rate is limited by the time required to communicate the shortest meaningful action potential, i.e. the time lapse between the start of an arriving spike and its end: around 1 millisecond. Also, the speed at which is modulated the neurotransmitter release into the synaptic cleft seems to agree with the 1 cycle per millisecond rate. Therefore, presynaptic, postsynaptic and hillock-type sectors should be able to operate at 1 cycle per millisecond rate.

The invention claimed is:

1. A computer-implemented method for real-time bio-realistic simulation of a neural network, the method comprising:
a) storing in memory definitions for a multiplicity of N distinct types of finite state machines (sector types, representing different sub-neural structure and processing), wherein each sector type has a number of data inputs, a number of data outputs, types of data inputs, types of data outputs, and a data compressor, wherein the N distinct sector types have different numbers of inputs, different numbers of outputs, or different manners of processing input signals to produce output signals;
b) storing in memory a multiplicity of sectors, wherein each sector is an instantiation of one of the multiplicity of sector types, wherein each sector has an internal state represented by a compressed history of data input to the sector, wherein the compressed history is factorized into distinct historical time intervals;

c) defining interconnections among data inputs and data outputs of the multiplicity of sectors to form a network of sectors; and d) emulating in parallel the network of sectors using parallel computers, wherein the emulating comprises, for each sector,
   i) processing data input to the sector to produce data output from the sector, wherein the processing comprises computing the compressed history of data input to the sector, storing the compressed history of data input to the sector in memory; and
   ii) communicating the data output to inputs of other sectors in accordance with the defined interconnections.

2. The method of claim 1 wherein the multiplicity of sectors contains more than 22500 sectors per neuron on average.

3. The method of claim 1 wherein computing the compressed input history comprises compressing the data input to the sector during a time interval.

4. The method of claim 1 wherein the data compressor $\Sigma = \sigma_T$ of a sector type T is defined to compress with constraint $y(0) = T(\Sigma(0))$, where $y(0)$ represents current data output from the sector.

5. The method of claim 1 wherein the data compressor $\Sigma = \sigma_T$ of a sector type T is factorable into data compressors defined on non-empty subsets of data inputs to the sector.

6. The method of claim 5 wherein the internal state is factored into a Cartesian product of factors stored in memory only once for multiple instantiations of the sector, thereby reducing the amount of memory used to describe states of the sectors.

7. The method of claim 1 wherein emulating the network comprises initializing each sector in the multiplicity of sectors such that every sector of a given type is initialized in the same state.

8. The method of claim 1 wherein the data compressor of each sector type comprises a lookup table stored in memory, and wherein computing the compressed history of data input to the sector comprises accessing a lookup table for a sector type for the sector.

9. The method of claim 1 wherein the processing data input to the sector to produce data output from the sector processing comprises computing from the stored compressed history of data input to the sector the data output from the sector.

10. The method of claim 9 wherein computing the output from the sector comprises computing an output function Q subjected to constraints imposed by replication of a statistical property of an output function F.

11. The method of claim 1 wherein the internal state requires at most 48 bits of memory per synapse.

12. The method of claim 1 wherein N is equal to the product of a number of neuron types to be emulated and a minimum number of neuron compartments to be considered.

13. The method of claim 1 further comprising generating search-engine style dictionaries and inverted indices to provide access to the multiplicity of sectors stored in memory.

14. The method of claim 13 wherein generating search-engine style dictionaries and inverted indices comprises storing shortened sector state values and sector connectivity maps on in-memory lists, wherein the method further comprises accessing a data item in the in-memory lists.

15. The method of claim 14 wherein the accessing comprises accessing the data item by pointers.

16. The method of claim 14 wherein the accessing comprises accessing the data item sequentially.

17. The method of claim 1 wherein the sector performs processing using a discrete time interval of less than 100 ms.

18. The method of claim 1 further comprising combining multiple signals that travel simultaneously through a dendrite by adding the multiple signals arithmetically to obtain a sum, applying to the sum an evolution operator to obtain a resulting signal, and then replacing the resulting signal by one signal in a discrete and finite subset of a set of possible signals.

* * * * *